United States Patent [19]
Hotka et al.

[11] Patent Number: 5,294,921
[45] Date of Patent: Mar. 15, 1994

[54] ELEVATOR COMMUNICATIONS BUS ANALYZER

[75] Inventors: Charles E. Hotka, McCordsville, Ind.; Robert D. Moore, Naperville, Ill.

[73] Assignee: Otis Elevator Company, Farmington, Conn.

[21] Appl. No.: 790,044

[22] Filed: Nov. 12, 1991

[51] Int. Cl.$^5$ .............................. G05B 23/02
[52] U.S. Cl. .................. 340/825.17; 340/825.06; 340/825.14
[58] Field of Search ........... 340/825.06, 825.07, 340/825.14, 825.17

[56] References Cited

U.S. PATENT DOCUMENTS 4,622,551 11/1986 Kupersmith et al. ............ 370/31 X

*Primary Examiner*—Donald J. Yusko
*Assistant Examiner*—Michael Horabik

[57] ABSTRACT

A method for allowing access to data frames on an elevator communications bus includes (a) disconnecting a remote station 117 from the communication bus 24; (b) connecting the elevator communications bus 24 to the elevator communications bus analyzer 100; (c) providing the power, return, clock, and data signals on lines 46a, 46b, 48a, 48b from the elevator communications bus analyzer 100 to the remote station 117 previously disconnected; (d) connecting receive or transmit trigger lines 120, 122 from the elevator communications bus analyzer 100 to an oscilloscope 24; (e) selecting an address of a remote station; (f) connecting clock and data signals on lines 46a, 46b to the oscilloscope 124; and (g) switching the oscilloscope 124 to its differential mode to provide on an oscilloscope screen the difference between the clock and data signals (the signal on line 46b minus the signal on line 46a) for the address so that an elevator mechanic may see the data bits on the elevator communications bus.

6 Claims, 3 Drawing Sheets

ELEVATOR COMMUNICATIONS BUS ANALYZER

TECHNICAL FIELD

The invention relates to detection of signals on an elevator communications bus. The invention detects data and command signals of an elevator communications system protocol which is in synchronous half duplex serial line format.

BACKGROUND OF THE INVENTION

U.S. Pat. No. 4,622,551 discloses a communications bus, including an industrial communications unit (ICU) and a master and one or more remote stations. An ICU is located in the master station and in each remote station. Each ICU reads and writes data subject to clock pulses in data frames. The ICU located in the master station transmits data to the ICUs in the remote stations and receives data communicated by the remote stations. The ICUs located in the remote stations transmit and receive data to and from the master. The data communicated between the master and remote stations includes various types of inputs and output into and out of the master and remote stations. For example, when a passenger activates a hall call button, a bit within a data frame is input to a remote station associated with that hall call button and that remote station outputs a bit to the master station. In response, the elevator system sends an elevator to the passenger, and an activation signal from the master station to a remote station associated with a bell activates that bell at the floor landing to announce the arrival of the elevator. Presently, if the elevator arrives but no bell is heard, there is no way to determine whether or not the activation signal was sent or the bell is broken, and the elevator system software is therefore defective.

If an elevator mechanic could display the data frames sent or received by a master or remote station, he could do a better job at troubleshooting the elevator system. That is, if at the landing he saw that the activation signal bit was sent to the remote station, he could immediately replace the bell and avoid having to investigate the software in the machine room and the bell. Presently, there is no way to display the data frames communicated on the communication bus.

DISCLOSURE OF THE INVENTION

The object of the invention is to allow access to data frames (transmit and receive) on an elevator communications bus, which bus includes a power line, a power return line (or simply return line), a data line, and a clock line, by: (a) disconnecting a remote station from the bus; (b) connecting the bus to an elevator communications bus analyzer; (c) providing the power, return, clock, and data signals on lines from the elevator communications bus analyzer to the remote station previously disconnected; (d) connecting receive or transmit trigger lines from the elevator communications bus analyzer to an oscilloscope; (e) selecting an address of a remote station; (f) connecting clock and data signal on a clock and a data line to the oscilloscope; and (g) switching the oscilloscope to its differential mode to provide on the oscilloscope screen the difference between the clock signal and data signal for said address so that an elevator mechanic may see the data frames on the elevator communications bus.

DETAILED DESCRIPTION OF THE INVENTION

Figure 1:
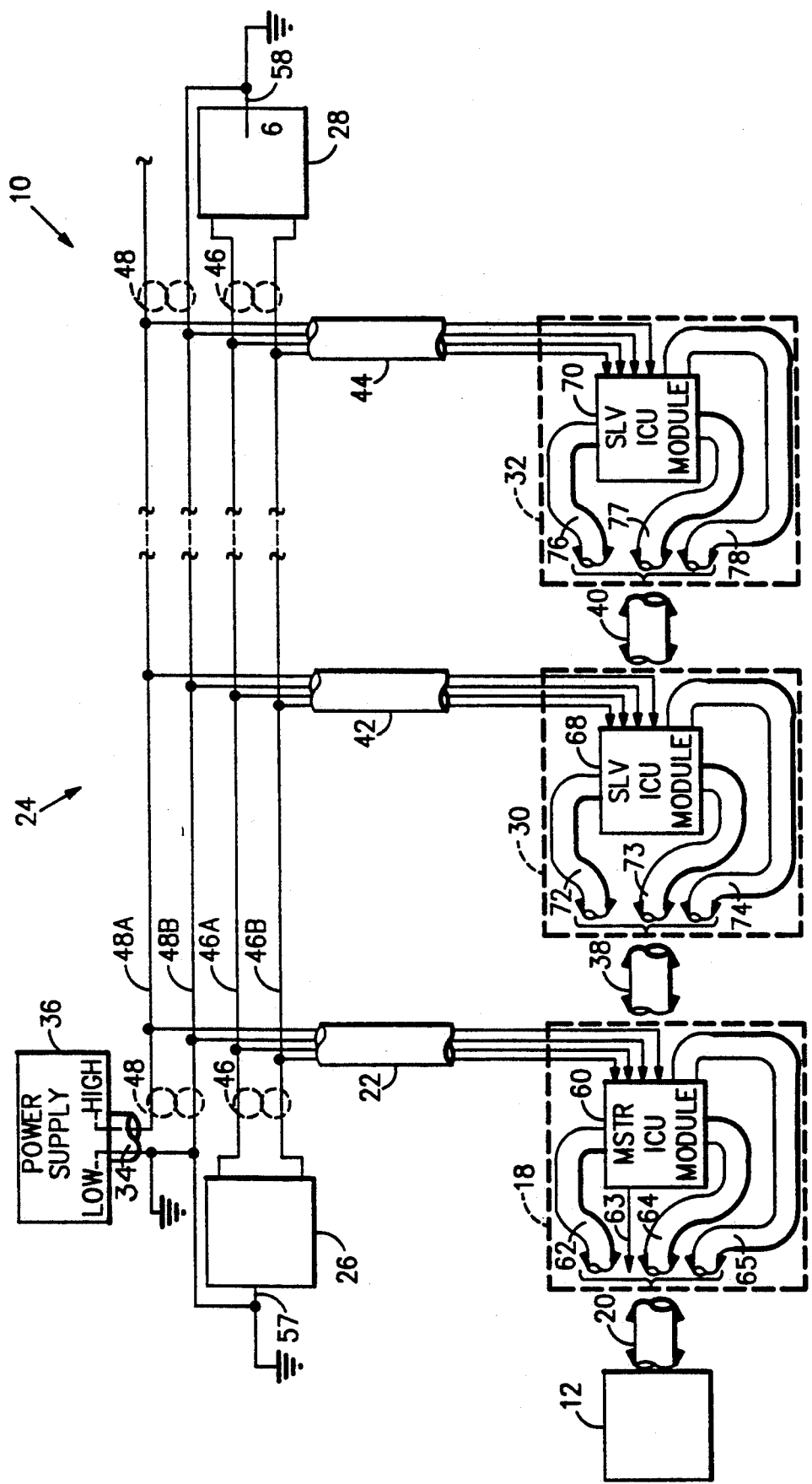
FIG. 1 is a schematic block diagram of a prior art communications system 10.

FIG. 1 is a schematic diagram of a elevator communications system 10 in accordance with the prior art. The elevator communications system 10 includes a master communications station 18 with input/output (I/O) lines 20 to a central control 12 and I/O lines 22 to the elevator communications bus 24. The bus 24 is dual function. The bus 24 includes a power bus for providing DC power to all stations. DC power is supplied to the bus 24 on lines 34 from power supply 36. The remote stations 30, 32 are connected through lines 38, 40 to associated remote devices and through lines 42, 44 to the bus 24. As shown, the bus 24 includes wire pairs 46, 48. The pair 46 with lines 46a, 46b, is the data transmission bus and is preferably a twisted wire pair. The pair 48 is the power bus with 48a, 48b, connected to the low and high voltage potential output of the power supply 36. The power supply 36 provides DC power to the master station 18 and remote stations 30, 32 and their associated remote devices (such as elevator position indicators, bells, hall call and car call buttons).

The master station 18 and remote stations 30, 32 include identical industrial communications unit (ICU) modules, as disclosed in U.S. Pat. No. 4,622,551, each being connected in the same manner to the communications bus 24. The ICU modules 60, 68, 70 are capable of being programmed in either a master or slave mode, depending on the ICU module application in either the master or remote station. The master station master ICU module 60 receives the four wire bus inputs through lines 22 and provides an I/O interface with a signal processor(not shown) in the central control 12 through lines 62–65 (included within lines 20 to the central control 12). Similarly, the remote station slave ICU modules 68, 70 receive the four wire bus inputs through lines 42, 44 and interface with their associated remote devices through lines 72–74 and 76–78 (included within lines 38, 40).

Figure 2:
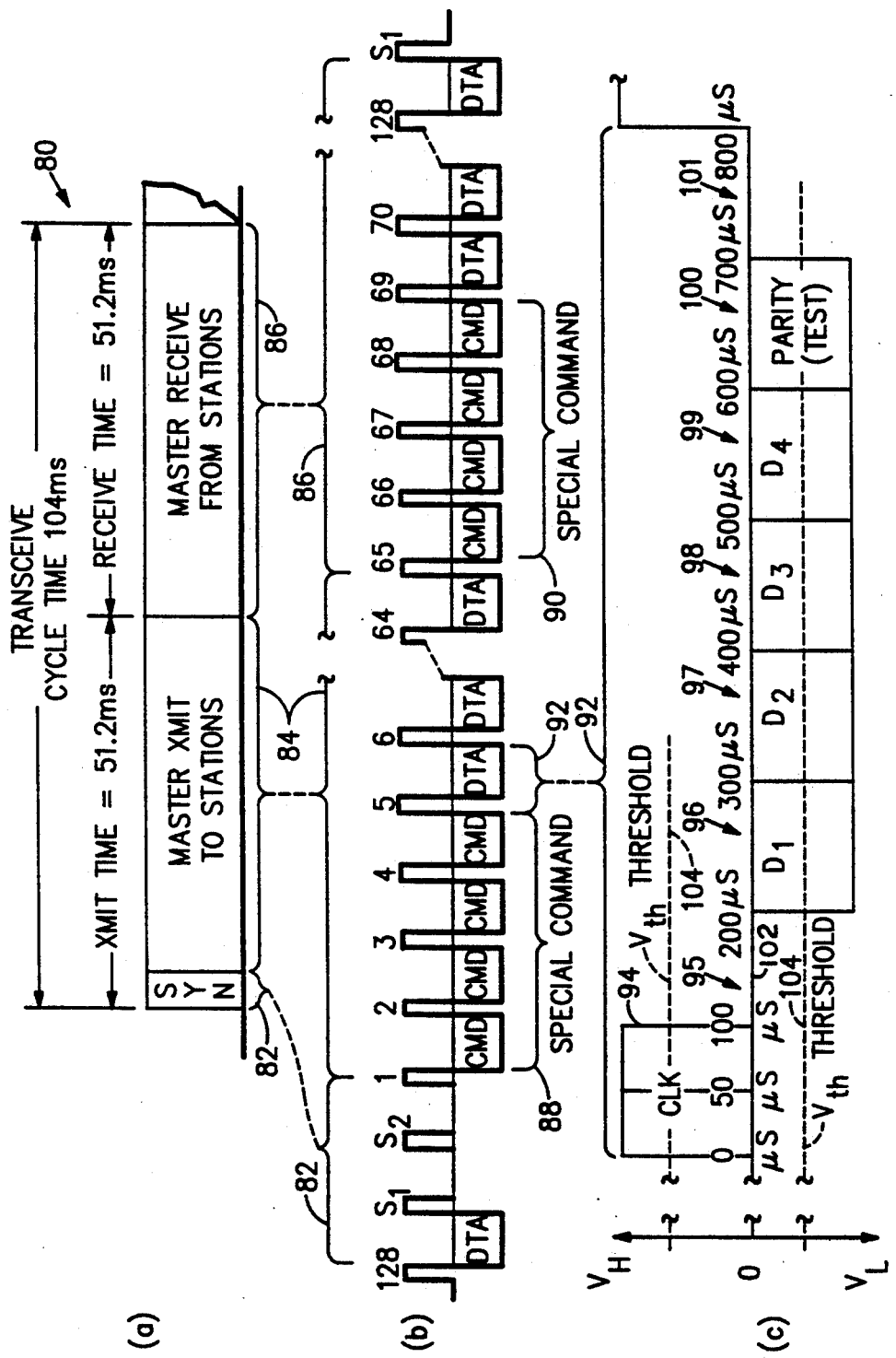
FIG. 2 is a series of three waveform illustrations used in the communications system 10 of FIG. 1.

The communication system protocol is in synchronous, half duplex, serial line format by which the master ICU of the master station 18 communicates bi-directionally with as many as 60 slave ICU remote station units. The serial line protocol is illustrated in FIG. 2, illustrations (a)–(c). The master ICU module 60 transmits data to, and receives data from, each of the remote slave ICUs 68, 70 in a succession of transceive cycles 80 (illustration (a)). Each cycle includes a synchronization frame 82 followed by 128 information frames divided equally between a transmit interval 84 (master ICU transmits to slave ICU) and a receive interval 86 (master ICU receives from slave ICU). Each information frame is marked by a line clock pulse transmitted at the system clock frequency. The synchronization frame 82 provides master to slave ICU synchronization once per cycle. It includes two line clock intervals which, when added to the 128 information frame clock pulses, requires 130 equally spaced line clock intervals for each transceived cycle.

Illustration (b) shows the 130 clock pulses as including two synchronization frame clock pulses ($S_1$, $S_2$) and 128 information frame clock pulses divided equally between the transmit frame 84 (clock pulses 1–64) and receive frame 86 (clock pulses 65–128). The synchronization frame clock pulses are actually missing. The synchronization frame itself is defined as the "dead time" interval (which includes the missing clock pulses $S_1$, $S_2$) between the 128 clock pulse of a preceding cycle and the first pulse of the present cycle.

The 64 information frames in the transmit and receive intervals service a maximum of 60 slave ICUs. The first group of four information frames in each interval 88, 90 (clock pulses 1–4 and 65–68) are for special command information to all station ICUs. The remaining 60 information frames are data frames. The master ICU transmits information to each slave ICU in a related transmit interval data frame and receives data from each slave ICU in a corresponding receive interval data frame. All the remote station slave ICUs receive and store the commands of frames 1–4 and 65–68. These commands may command the slave ICUs to receive information from the master or transmit information to the master.

Each slave ICU has an assigned address. The line clock pulses are counted and decoded by the slave ICUs following each synchronization frame to determine the presence of an assigned address, at which time the ICU reads or writes a data frame from or to the transmission line. The format for the information frames, both special command frames 88–90 and data frames are identical, as shown as information frame 92 in illustration (c). The frame time interval is divided into eight 100 microsecond states. The first state (0–100 microseconds) corresponds to clock pulse interval 94 and must be a minimum of 50 microseconds wide to be valid. The second state 95 (100–200 microseconds) is a "dead time" interval which allows for response time tolerances in sample time delay between the frame clock pulse and data bits. The next five states 96–100 (200–700 microseconds) are five signal bit time intervals; the first four of which (96–99) correspond to the four data bits $D_1$–$D_4$. The bit time is equal to the state time, or 100 microseconds for the selected 104 ms transceive cycle time. The fifth bit is a special feature bit which may be received and transmitted by each of the slave ICUs. This fifth bit is used for parity test during the master receive cycle and for position indication during the master transmit cycle. The last state 101 is also a dead time interval prior to the beginning of the succeeding data frame.

As shown in FIG. 2, the signal data format is bi-polar. Line 46a is the clock line $L_2$ input to the ICUs with the line 46b being the data line $L_1$ input. The data frames are equal to the difference between the clock signals on line 46a and data signals on line 46b.

The master 60 will generate a clock signal which the master 60 and remote stations 30, 32 will synchronize to in each communication cycle. A communication cycle consists of a period of time in which the master writes data on the communication bus 24 and a period of time in which the master reads on the communication bus 24. The master 60 and all the remotes 30, 32 constantly monitor line 46A clock signals and synchronize each time they see two missing clock pulses. This is described as the beginning of a communications cycle. Each remote station 30, 32 is assigned a frame to receive and a frame to transmit data to the master station 18.

Figure 3:
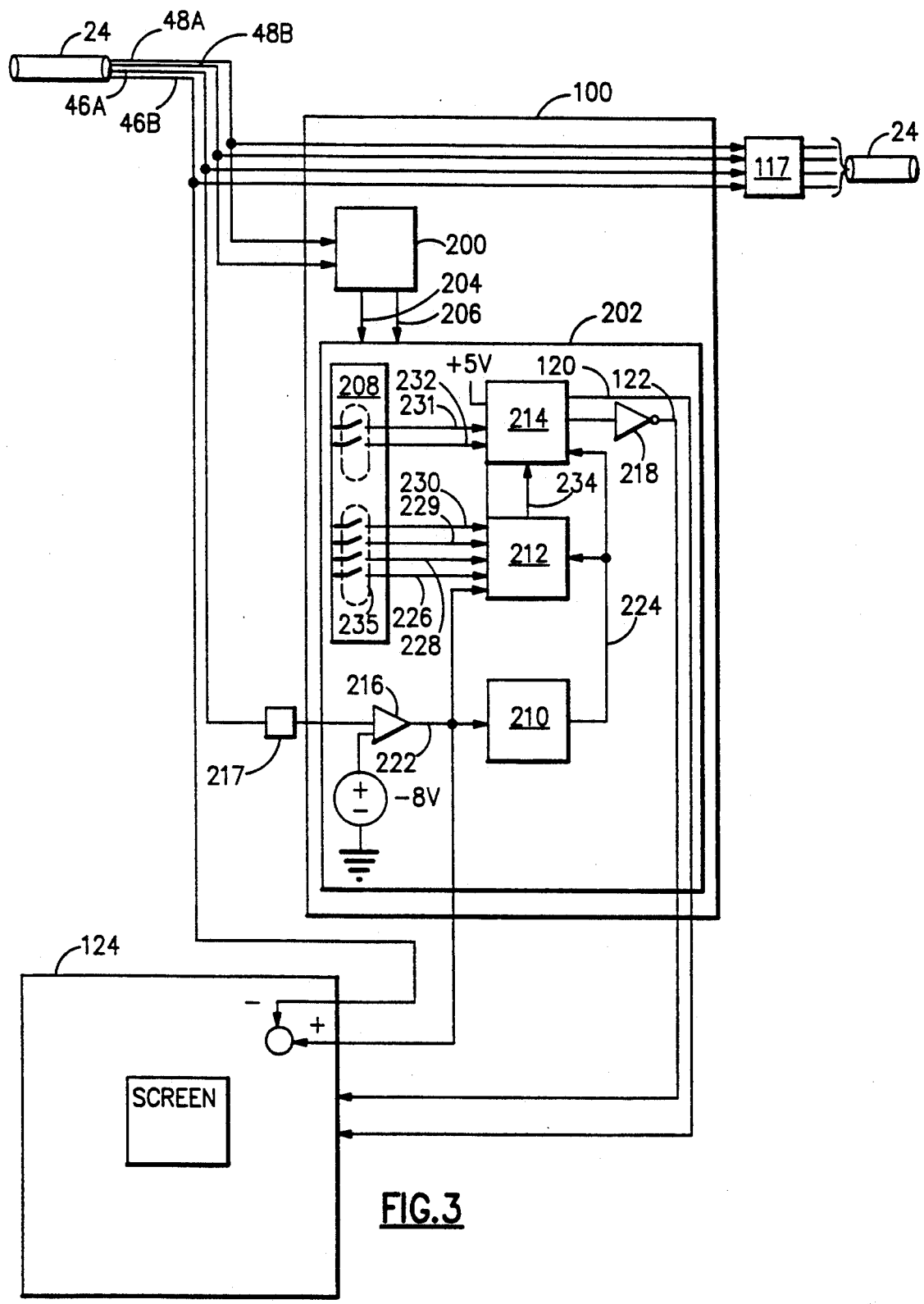
FIG. 3 is a schematic block diagram of an elevator communications bus analyzer used for observing the illustrations of FIG. 2 of the waveforms found on an elevator communications bus 24.

FIG. 3 shows an elevator communications bus analyzer 100 having four input lines 46a, 46b, 48a, 48b which provide power, return, clock, and data signals. Leaving the elevator communications bus analyzer 100 are power, return, data, and clock signals on lines 46a, 46b, 48a, 48b as shown in FIG. 1. The invention includes: (a) disconnecting a remote station 117 from the communication bus 24; (b) connecting the elevator communications bus 24 to the elevator communications bus analyzer 100; (c) providing the power, return, clock, and data signals on lines 46a, 46b, 48a, 48b from the elevator communications bus analyzer 100 to the remote station 117 previously disconnected; (d) connecting receive or transmit trigger lines 120, 122 from the elevator communications bus analyzer 100 to an oscilloscope 124; (e) connecting clock and data signals on lines 46a, 46b to the oscilloscope 124; and (f) switching the oscilloscope 124 to the differential mode to provide on the oscilloscope screen the difference between the clock and data signals (the signal on line 46b minus the signal on line 46a) so that an elevator mechanic may see the data frames on the elevator communications bus.

As shown in FIG. 3, the elevator communications bus analyzer 100 includes a power supply 200 and a scope-triggering circuit 202. The power supply 200 is responsive to the power and return lines 48a, 48b which provide 30 volts DC. The power supply 200 provides 5 volts DC across lines 204, 206 to the scope-triggering circuit 202.

The scope-triggering circuit 202 includes an address selector 208, a mono-stable multivibrator (MVBR) 210, a first down counter 212, a second down counter 214, a comparator 216, and an inverting amplifier 218. The first 64 down counts of the two down counters 212, 214 represent the master transmit cycle and the first 64 data frames following the synchronization pulse. The second 64 counts represent the master receive cycle and the second 64 data frames following the synchronization pulse.

The clock signal is provided on line 46a to the comparator 216 for comparison with 0.8 volts after being passed through a low pass filter 217. The clock signal is provided on a line 222 to the MVBR 210 and first down counter 212. The clock signal on line 222 is periodic and includes 128 clock pulses and a synchronization signal which consists of the absence of two clock pulses. The MVBR 210 detects the synchronization signal and provides a missing pulse signal on a line 224 to the first down counter 212 and second down counter 214.

The first down counter 212 is responsive to the missing pulse signal provided on line 224, the clock signal provided on line 222, first, second, third, and fourth address signals provided on lines 226, 228, 229, 230 and provides a borrow signal on a line 234. Application of the clock signal on line 222 to the first down counter 212 causes the first down counter 212 to count down. Because the clock signal is provided continuously, the first down counter 212 is continuously enabled to count down after receiving the first missing pulse signal. And, because the first, second, third, and fourth address signals are binary signals corresponding to $2^0$, $2^1$, $2^2$, and $2^3$ respectively, the first down counter 212 is continuously enabled to count down from as high as 15 to 0. The rate at which the down counter counts down is equal to the frequency of the clock pulses provided on line 222.

The second down counter 214 is responsive to the borrow signal on line 234, fifth and sixth address signals on lines 231, 232, and a seventh address signal on a line 233. The fifth and sixth address signals on lines 231, 232 represent $2^4$ and $2^5$, respectively. The first, second, third, fourth, fifth, and sixth address signals are binary and selectable by means of six switches on the address selector 208. The seventh address signal represents $2^6$ and is not selectable, but rather provides a count of 64 to the second down counter each time that the second down counter is initialized with the missing pulse signal.

To view a data frame associated with a particular address, the address is selected by flipping the appropriate switches 235 in the address selector 208. The addresses are loaded onto address lines 226, 228, 229, 230, 231, 232 into first and second down counters 212, 214 in response to the missing pulse signal. Simultaneously, and in response to the missing pulse signal, a base address of 64 is loaded into the second down counter 214. The receive trigger line 120 is now low and the transmit trigger line 122 is high.

In response to the first clock pulse on line 46a following the missing pulse signal, the first down counter 212 begins counting down from the count established by the address lines 226, 228, 229, 230. When the first down counter 212 reaches zero, it sends a borrow signal on a line 234 to the second down counter 214 (no signal from the second down counter 214 is sent to the first down counter 212 in response to the borrow signal) and counts down from 15 to zero. If no address was loaded into the second down counter by means of the address selector 208, the count in the second down counter decrements by 16 from its maximum value of 64. Thus, the count in the second down counter 214 changes from a binary 1 for the bit representative of $2^6$ to binary zero, binary zero for the bit representative of $2^5$ to binary 1, and binary zero for the bit representative of $2^4$ to binary 1. And, since the count in the first down counter 212 became 15 following the borrow signal, the total address in the first and second down counters 212, 214 is 63.

When the count in the second down counter 214 decreases below 64, the transmit trigger output on line 122 goes low. In response to the low signal at the transmit trigger output, the inverter 218 inverts the low signal and provides a high signal on the transmit trigger line 122 for triggering the oscilloscope 124. If 46a and 46b are connected to the oscilloscope 124 in a differential mode such that the clock signal is subtracted from the data signal (line 46b minus 46a) and the oscilloscope 124 is connected so as to trigger from the transmit trigger signal on line 122, the transmit data frame associated with the selected address will appear on the screen of the oscilloscope 124. The first down counter 212 will continue to count down from 15 to zero and then provide a borrow signal to the second down counter 214.

When the first down counter 212 counts down to zero and there is no count in the second down counter 214 (the count in both counters now being zero), and when a borrow signal is sent from the first down counter 212 to the second down counter 214, both transmit and receive trigger signal outputs from the second down counter 214 go high, resulting in a low signal on the transmit trigger line 122 (because of the inverter) and a high on the receive trigger line 120. If at that time the receive trigger line 120 is connected to the trigger input of the oscilloscope 124 and lines 46a, 46b are connected differentially so that the signal on line 46a is subtracted from the signal on line 46b, the oscilloscope 124 will trigger in response to the receive trigger signal and display the receive data frame for the address selected. However, if at this time the transmit trigger signal is still connected to the oscilloscope, nothing will appear on the screen. The oscilloscope is set for positive trigger.

An elevator mechanic may now look at the oscilloscope screen and view the data frames entering and leaving a particular master 18 station or remote station 30, 32. With this information he can better judge whether a problem is in software or hardware.

We claim:

1. A process for obtaining data frames passed between a master station and a remote station on an elevator communications bus, said elevator communications bus providing and receiving power, return, clock and data signals by means of and in respect of a power line, return line, clock line, and data line, the values of said data frames being equal to the difference between said data signals an said clock signal, said process comprising the steps of:

detecting a synchronization frame within a clock signal, for providing a missing pulse signal for indicating the absence of a data frame;

selecting an address of a remote station;

providing said missing pulse signal to a counter;

loading said address into said counter in response to said missing pulse signal;

counting from said address loaded into said counter to a limit and providing a trigger signal to an oscilloscope;

providing said clock signals to said oscilloscope;

providing said data signals to said oscilloscope;

switching said oscilloscope to a differential mode to provide on the oscilloscope screen, in response to said trigger signal, the difference between said clock and data signals.

2. The process of claim 1, wherein said steps of selecting, providing, loading and counting collectively include the steps of:

providing said missing pulse signal to a first down counter and a second down counter;

loading said address into said first and second down counters in response to said missing pulse signal, including loading upper bits of said address into said second down counter, and loading lower bits of said address into said first down counter; loading a base address into said second counter; and counting down from said address loaded into said first and second down counters to the base address and providing a transmit trigger signal to said oscilloscope when only said base address is left in said second counter.

3. The process of claim 1, wherein said steps of selecting, providing, loading and counting collectively include the steps of:

selecting an address of a remote station, wherein said address includes upper and lower bits;

providing said missing pulse signal to a first down counter and a second down counter;

loading said address into said first and second down counters in response to said missing pulse signal, including loading said upper bits into said second down counter, and loading said lower bits into said first down counter;

loading a base address into said second down counter;

counting down from the address loaded into said first and second down counters to the base address; and counting down from the base address and providing a receive trigger signal to an oscilloscope when no address is left in said first and second counters.

4. An elevator communications bus analyzer for obtaining information frames form an elevator communications bus, said elevator communications bus providing and receiving power, return, clock and data signals by means of and in respect of a power line, return line, clock line, and data line, said analyzer comprising:

pulse generating means, responsive to a synchronization frame in said clock signal, for providing a missing pulse signal, thereby indicating the absence of a data frame;

address means for providing an address and a base address;

counting means, for loading the sum of said base address and said address in response to said missing pulse signal, said counting means being operable to count down from said address to said base address for providing a trigger signal;

an oscilloscope responsive to said trigger signal for displaying the difference between said data signal and said clock signal.

5. The elevator communications bus analyzer of claim 4, wherein said counting means is operable to count down from said address to said base address to provide a transmit trigger signal and said oscilloscope is responsive to said receive trigger signal for displaying the difference between said data signal and said clock signal.

6. The elevator communications bus analyzer of claim 4, wherein said counting means is operable to count down from said base address to zero to provide a receive trigger signal and said oscilloscope is responsive to transmit trigger signal for displaying the difference between said data signal and said clock signal.

* * * * *